United States Patent
Gaufin

(10) Patent No.: US 11,639,166 B2
(45) Date of Patent: May 2, 2023

(54) SPRING BRAKE ACTUATORS

(71) Applicant: TSE Brakes, Inc., Cullman, AL (US)

(72) Inventor: Carl Gaufin, Madison, AL (US)

(73) Assignee: TSE Brakes, Inc., Cullman, AL (US)

( * ) Notice: Subject to any disclaimer, the term of this patent is extended or adjusted under 35 U.S.C. 154(b) by 56 days.

(21) Appl. No.: 17/176,832

(22) Filed: Feb. 16, 2021

(65) Prior Publication Data

US 2021/0253078 A1  Aug. 19, 2021

Related U.S. Application Data

(60) Provisional application No. 62/977,502, filed on Feb. 17, 2020.

(51) Int. Cl.
| | |
|---|---|
| *B60T 17/08* | (2006.01) |
| *F16D 65/28* | (2006.01) |
| *F16D 25/08* | (2006.01) |
| *F16D 67/04* | (2006.01) |
| *F16D 121/04* | (2012.01) |
| *F16D 121/10* | (2012.01) |

(52) U.S. Cl.
CPC .......... *B60T 17/083* (2013.01); *F16D 25/087* (2013.01); *F16D 65/28* (2013.01); *F16D 67/04* (2013.01); *F16D 2121/04* (2013.01); *F16D 2121/10* (2013.01)

(58) Field of Classification Search
CPC .... B60T 11/16; B60T 17/083; F16D 2121/04; F16D 2121/10; F16D 2121/16; F16D 2127/06; F16D 25/087; F16D 67/04; F16D 65/28

See application file for complete search history.

(56) References Cited

U.S. PATENT DOCUMENTS

| | | | |
|---|---|---|---|
| 3,182,566 A | 5/1965 | Berg et al. | |
| 4,036,111 A | 7/1977 | Dahlkvist et al. | |
| 5,285,716 A | 2/1994 | Thompson | |
| 5,620,077 A * | 4/1997 | Richard | B60T 13/743 |
| | | | 188/173 |
| 5,791,232 A | 8/1998 | Smith | |
| 6,267,207 B1 | 7/2001 | Fleischer et al. | |
| 6,314,861 B1 | 11/2001 | Smith et al. | |

(Continued)

FOREIGN PATENT DOCUMENTS

| | | | | |
|---|---|---|---|---|
| CN | 102883930 B | * | 10/2015 | ............ B60T 13/743 |
| DE | 10392838 B4 | * | 3/2016 | .............. B60T 13/22 |

(Continued)

OTHER PUBLICATIONS

English translation of WO 2013117605 A2 (Year: 2013).*

(Continued)

*Primary Examiner* — Robert A. Siconolfi
*Assistant Examiner* — Mahbubur Rashid
(74) *Attorney, Agent, or Firm* — Andrus Intellectual Property Law, LLP

(57) ABSTRACT

A spring brake actuator for applying a brake of a vehicle includes a housing containing a diaphragm that separates the housing into first and second chambers. A clutch actuator device is for selectively compressing a compression spring such that the spring brake actuator is operable in a plurality of states including a parking state, driving state, and a braking state.

20 Claims, 11 Drawing Sheets

(56) References Cited

U.S. PATENT DOCUMENTS

| | | |
|---|---|---|
| 6,394,462 B1 | 5/2002 | Constantinides et al. |
| 6,405,635 B1 | 6/2002 | Smith et al. |
| 6,491,141 B1 | 12/2002 | Severinsson |
| 6,634,276 B1 | 10/2003 | Lacroix et al. |
| 8,172,047 B2 | 5/2012 | Iraschko |
| 8,424,655 B2 * | 4/2013 | Iraschko ............... B60T 17/083 188/170 |
| 8,522,666 B2 | 9/2013 | Anooshian et al. |
| 9,050,958 B2 | 6/2015 | Gaufin |
| 9,140,276 B2 * | 9/2015 | Griffiths ................ F15B 15/261 |
| 9,156,458 B2 | 10/2015 | Plantan et al. |
| 9,297,392 B2 | 3/2016 | Gaufin |
| 9,981,646 B2 * | 5/2018 | Dobrowolski .......... B60T 13/38 |
| 10,059,322 B2 | 8/2018 | Gaufin et al. |
| 10,106,140 B2 * | 10/2018 | Shimomura ............. F16J 15/56 |
| 2002/0171285 A1 | 11/2002 | Nelander |
| 2003/0070888 A1 | 4/2003 | Baumgartner et al. |
| 2004/0055838 A1 | 3/2004 | Severinsson |
| 2005/0051391 A1 | 3/2005 | Severinsson |
| 2005/0179315 A1 * | 8/2005 | Severinsson ............ B60T 17/08 303/89 |
| 2008/0106144 A1 | 5/2008 | Schrader |
| 2008/0217117 A1 | 9/2008 | Severinsson et al. |
| 2010/0082213 A1 | 4/2010 | Taylor et al. |
| 2012/0048659 A1 * | 3/2012 | Thibaut ................ B60T 17/083 188/170 |
| 2014/0130491 A1 * | 5/2014 | Gandhi ..................... F03G 7/06 60/527 |
| 2018/0231082 A1 | 8/2018 | Gaufin et al. |
| 2018/0281767 A1 | 10/2018 | Gregoire et al. |

FOREIGN PATENT DOCUMENTS

| | | | |
|---|---|---|---|
| DE | 102018108337 A1 * | 6/2019 | |
| EP | 2423062 A2 * | 2/2012 | ............ B60T 13/741 |
| EP | 2414206 B1 * | 9/2018 | ............ B60T 13/683 |
| EP | 2812218 B1 * | 8/2019 | ............ B60T 13/36 |
| WO | WO-2008116632 A2 * | 10/2008 | ............ B60T 17/08 |
| WO | WO-2013117605 A2 * | 8/2013 | ............ B60T 17/16 |

OTHER PUBLICATIONS

U.S. Appl. No. 16/688,761, filed Nov. 29, 2019.
International Search Report and the Written Opinion for Corresponding International Application No. PCT/US2021/018315, dated Apr. 29, 2021.

\* cited by examiner

SPRING BRAKE ACTUATORS

CROSS-REFERENCE TO RELATED APPLICATION

The present disclosure is based on and claims priority to U.S. Provisional Patent Application No. 62/977,502 filed Feb. 17, 2020, the disclosure of which is incorporated herein by reference.

FIELD

The present disclosure relates to vehicle braking systems, and in particular to spring brake actuators for actuating a wheel brake.

BACKGROUND

The following U.S. Patent Application Publication is incorporated herein by reference in entirety.

U.S. Patent Publication No. 2018/0281767 discloses a spring brake actuator. The spring brake actuator has a push rod assembly with a base located in a service brake chamber and a push rod extending from a service brake chamber. Pneumatic activation of the spring brake actuator causes the push rod to further extend out of the service brake chamber to thereby engage a wheel brake with a wheel of the vehicle. Pneumatic deactivation of the spring brake actuator causes the push rod to retract back into the service brake chamber to thereby disengage the wheel brake from the wheel of the vehicle.

The following U.S. Patents further describe the state of the art and are also incorporated herein by reference in entirety: U.S. Pat. Nos. 10,059,322; 9,297,392; 9,050,958; 8,522,666; 6,405,635; 6,394,462; 6,314,861; 5,791,232; and 5,285,716. In addition, U.S. patent application Ser. No. 16/688,761, filed Nov. 19, 2019, is incorporated herein by reference in entirety.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a spring brake actuator for applying a brake of a vehicle includes a housing containing a diaphragm that separates the housing into first and second chambers. A push rod assembly has a push rod that extends out of the second chamber. The diaphragm is flexible in a first direction to retract the push rod inwardly relative to the second chamber and in an opposite second direction to extend the push rod outwardly from the second chamber. A compression spring is in the first chamber, and a return spring in the second chamber. A port is for conveying pressurized air to the first chamber. A clutch actuator device is for selectively compressing the compression spring. The spring brake actuator is operable in a plurality of states including a parking state, a driving state, and a braking state. In the parking state the clutch actuator device permits extension of the compression spring, which flexes the diaphragm in the second direction, compresses the return spring, and extends the push rod further outwardly from the second chamber for applying the brake of the vehicle. In the driving state the clutch actuator device compresses the compression spring, which permits the return spring to extend, which flexes the diaphragm in the first direction and retracts the push rod further inwardly relative to the second chamber for disengaging the brake of the vehicle. In the braking state the clutch actuator device compresses the compression spring, and pressurized air is conveyed to the first chamber via the port, which flexes the diaphragm in the second direction, which compresses the return spring and extends the push rod further outwardly from the second chamber for applying the brake of the vehicle.

The clutch actuator device is specially configured to selectively retain the compression spring of the spring brake actuator in a compressed position. The clutch actuator device includes a drive rod that extends into the spring brake actuator and operably engages the compression spring. An inner and outer cylinders are concentrically aligned on the drive rod. Relative rotation between the inner and outer cylinders causes the drive rod to move further out of the inner cylinder for decompressing the compression spring and alternately to move further into the inner cylinder for compressing the compression spring. A motor causes the relative rotation, and a pneumatically actuated clutch mechanism is movable into an engaged position preventing said relative rotation and a disengaged position permitting said relative rotation.

Various other features, objects, and advantages will be made apparent from the following description taken together with the drawings.

BRIEF DESCRIPTION OF THE DRAWINGS

The present disclosure includes reference to the following Figures. The same numbers are used throughout the Figures to reference like features and like components.

DETAILED DESCRIPTION

Trucks, trailers and other vehicles often have pneumatically-operated spring brake actuators, which provide the braking force necessary to stop the vehicle. A brake pedal is positioned on the floor of the vehicle's cab and, upon activation, causes pressurized air from a reservoir to enter the spring brake actuator, which in turn causes a push rod to extend out of the spring brake actuator and activate a wheel brake. The wheel brake typically has brake shoes with a brake lining material that is pressed against a brake drum at the vehicle wheel-end to thereby brake the vehicle. The wheel brake often includes a slack adjuster which turns a cam roller via a camshaft to force the brake shoes to engage the brake drum and brake the vehicle. Releasing the brake pedal causes the pressurized air to be released from the air chamber such that a return spring within the air chamber retracts the push rod back to its original position. The spring brake actuator of the present disclosure can be used in conjunction with a variety of known brake assemblies, including both brake drum assemblies and brake disc assemblies.

Whereas the prior art predominately consists of fully pneumatically-actuated spring brake actuators, during research and development, the present inventor has determined that it would be advantageous to provide improved spring brake actuators that are both pneumatically and electro-mechanically actuated. The present disclosure is a result of the inventor's efforts in this regard.

Figure 1:
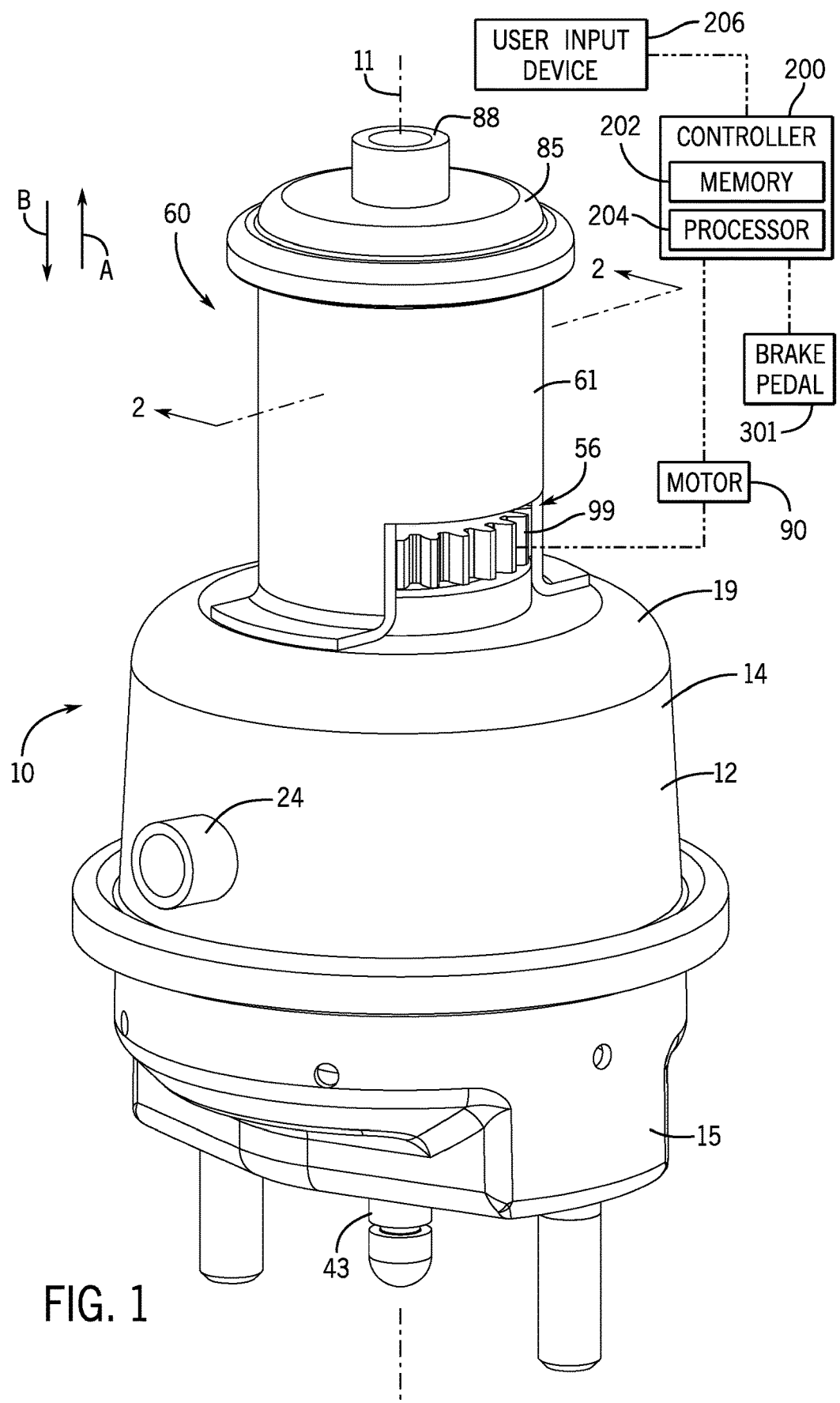
FIG. 1 is a perspective view of an example spring brake actuator having a clutch actuator device according to the present disclosure.
Figure 2:
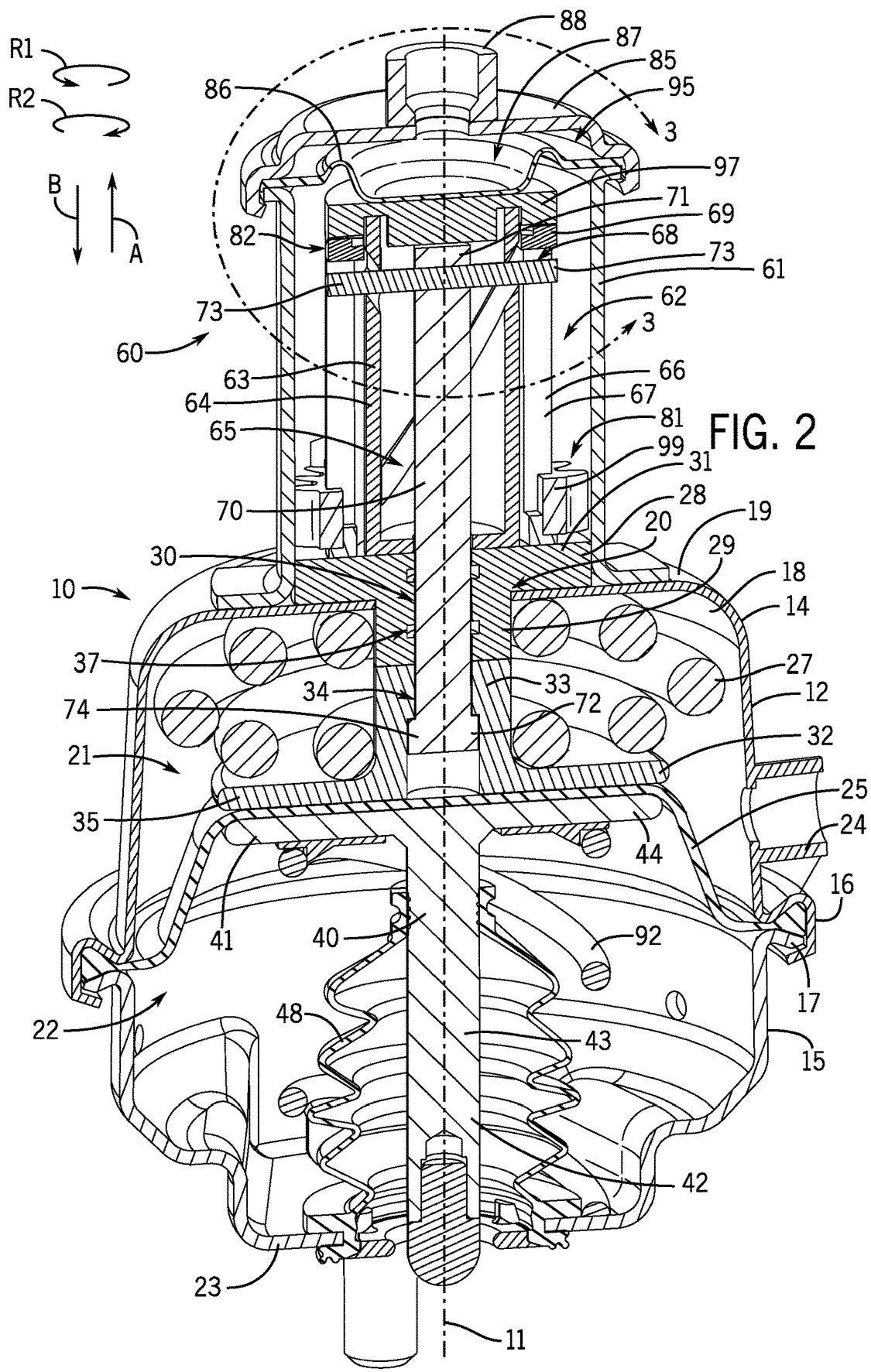
FIG. 2 is a cross-sectional view of the spring brake actuator of FIG. 1 in a driving state. A clutch mechanism of the clutch actuator device is in an engaged position.

FIGS. 1-2 depict a spring brake actuator 10 of the present disclosure for applying a wheel brake of a vehicle. The spring brake actuator 10 extends along a center axis 11 and has an axially elongated housing 12. The housing 12 includes opposing cup-shaped end portions, namely a first end portion 14 and a second end portion 15. The first and second end portions 14, 15 have perimeter flanges 16, 17 respectively, that engage each other in a sealing relationship. The housing 12 defines a first chamber 21 and a second chamber 22. The first chamber 21 is separated from the second chamber 22 by a diaphragm 25. The perimeter of the diaphragm 25 is held and compressed by the perimeter flanges 16, 17. A port 24 formed through the first end portion 14 is configured to admit and release compressed air to and from the first chamber 21. The pressurized air can be provided by a conventional source of pressurized air located on the vehicle. A novel clutch actuator device 60 is located on the end of the housing 12 adjacent the first chamber 21. The clutch actuator device 60 will be further described herein below.

A bracket 28 is coupled to the first end portion 14. The bracket 28 has a stub portion 29 that axially extends through a hole 20 defined in the first end portion 14. The stub portion 29 has a bore 30 extending there through, and a pair of annular grooves 37 is defined in the stub portion 29 and encircles the bore 30. A flange 31 radially extends from the stub portion 29 along the outer end wall 19 of the first end portion 14.

A compression spring 27 is in the first chamber 21 and has a first end compressed against the inner end wall 18 of the first end portion 14 and an opposite second end compressed against a pressure plate 32. The pressure plate 32 is located axially between the compression spring 27 and the diaphragm 25. The pressure plate 32 has a stub portion 33 with a bore 34 extending there through and a flange 35 that radially extends from the stub portion 33. The second end of the compression spring 27 encircles the stub portion 33 and engages the flange 35.

A push rod assembly 40 has a first end portion 41 abutting the diaphragm 25 and an opposite, second end portion 42 extending out of second chamber 22. The second end portion 42 is pivotably coupled to a lever arm of a conventional slack adjuster or cam roller (not shown). The slack adjuster and/or cam roller is configured to translate reciprocal movement of the push rod assembly 40 to a wheel brake for the vehicle (refer to the above-incorporated references for further description of the slack adjuster and cam roller). The push rod assembly 40 has a push rod 43 located in the second chamber 22 and extending through a hole in the end wall 23 of the second end portion 15. The push rod assembly 40 also includes an end flange 44 that abuts the diaphragm 25 such that as the diaphragm 25 flexes back and forth in the housing 12, the push rod 43 reciprocates out of and back into the second chamber 22.

A flexible bellows 48 is coupled to the end wall 23 of the second end portion 15 and the push rod 43 and is configured to prevent debris and moisture from entering the second chamber 22. In certain examples, a return spring 92 is located in the second chamber 22 and is compressed between the end wall 23 of the second end portion 15 and the end flange 44 to thereby bias the push rod 43 into the second chamber 22 and oppose movement of the push rod 43 out of the second chamber 22 via the hole in the end wall 23.

Figure 3:
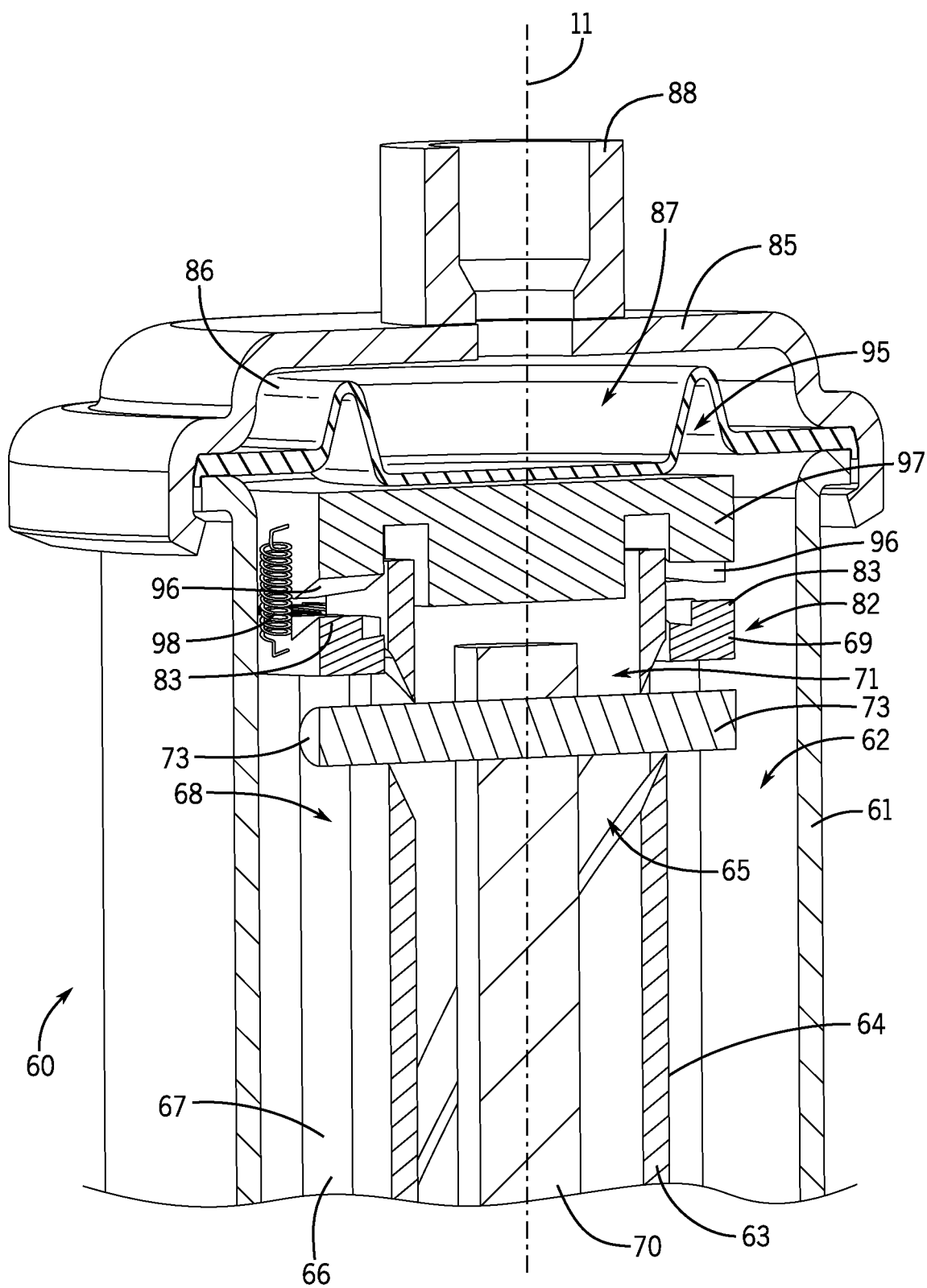
FIG. 3 is an enlarged cross-sectional view of the spring brake actuator of FIG. 2 within line 3-3 on FIG. 2. The clutch mechanism is in a disengaged position.
Figure 6:
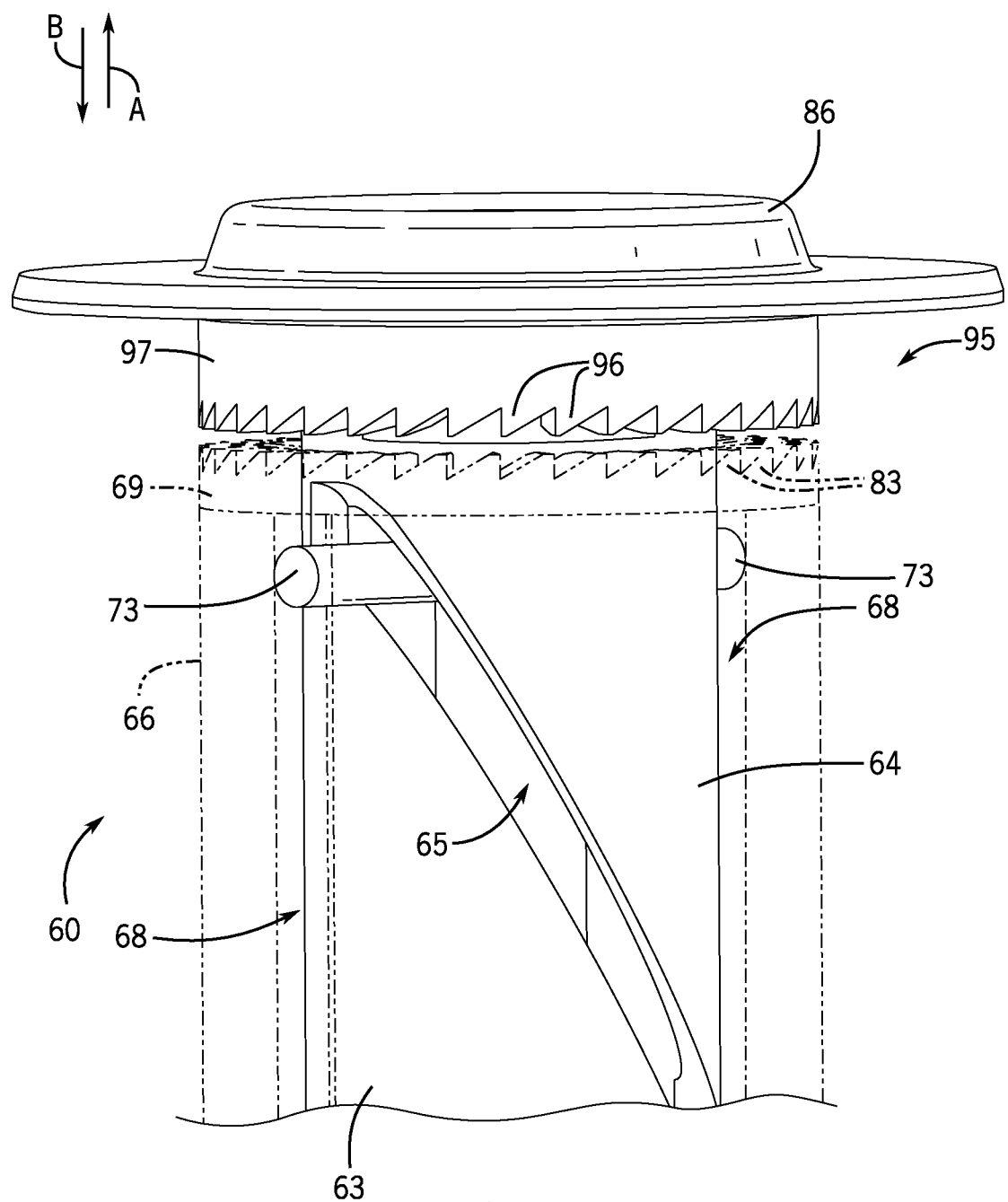
FIG. 6 is a view like FIG. 4 depicting inner and outer cylinders of the clutch actuator device. The outer cylinder is depicted in dashed lines.
Figure 7:
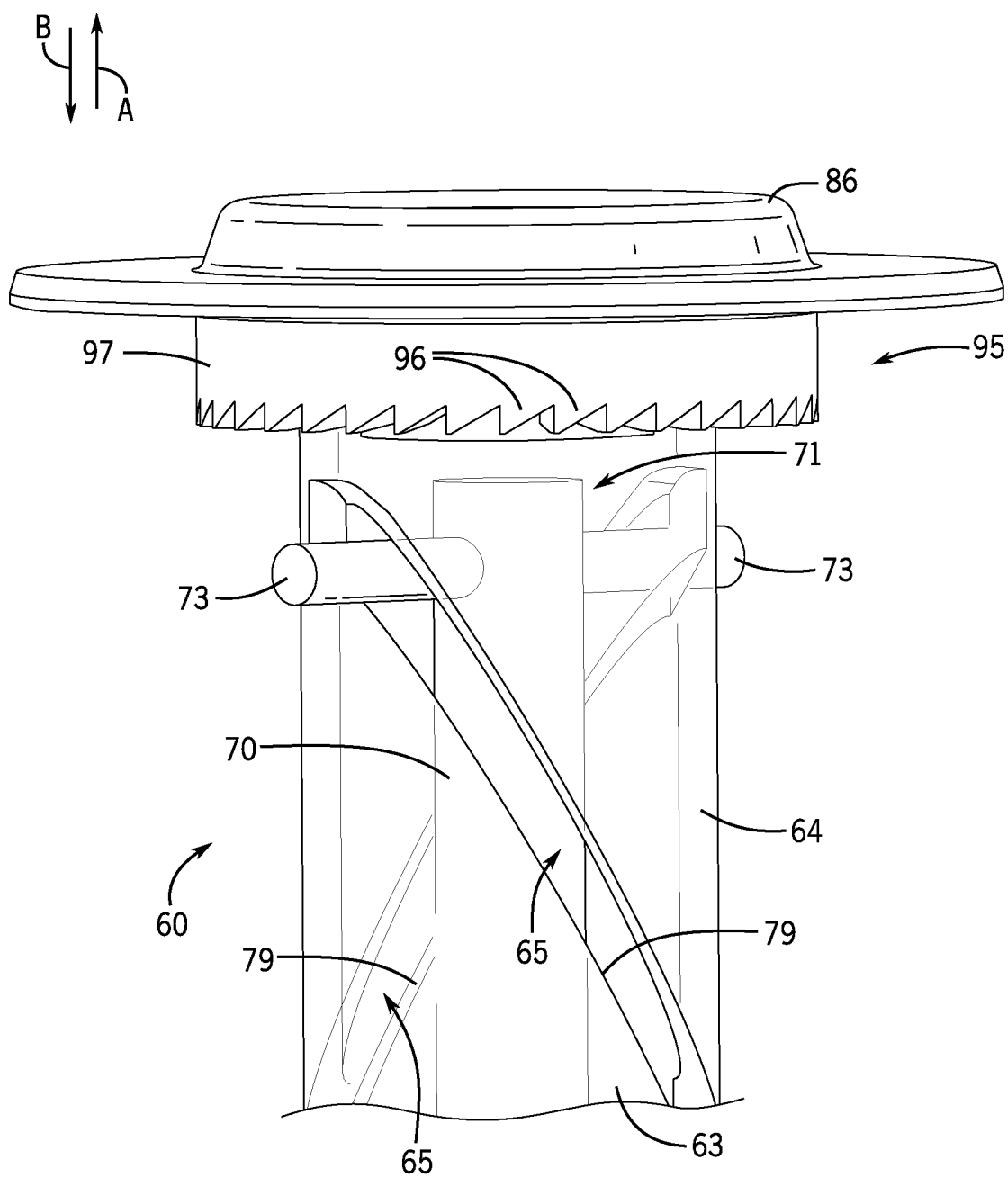
FIG. 7 is a view like FIG. 4 with the outer cylinder removed and depicting the inner cylinder and a drive rod. The inner cylinder is depicted as transparent.

The clutch actuator device 60 is coupled to the first end portion 14 and is for selectively compressing the compression spring 27. The clutch actuator device 60 has a shroud 61 having a shroud cap 85. The shroud 61 is coupled to the outer end wall 19 of the first end portion 14. The shroud 61 has a slot 56 (see FIG. 1) and defines a cavity 62 (see FIG. 2) in which a hollow inner cylinder 63 and a hollow outer cylinder 66 are positioned. The inner cylinder 63 is fixed to the flange 31 of the bracket 28 and has a sidewall 64 (FIG. 3) with a diametrically opposed curved slots 65 defined therein (FIG. 7). In the illustrated embodiment, the curved slots 65 are helical. The inner cylinder 63 has a surface 79 (FIG. 7) along which pins 73 (described herein below) slide. Note that in some instances the surface 79 acts as ramps (described further herein below). The outer cylinder 66 is concentric with the inner cylinder 63 and is rotatable relative to the inner cylinder 63. The outer cylinder 66 has a sidewall 67 (FIG. 3) with a diametrically opposed axial slots 68 defined therein (see FIG. 6), a first end 81 located near the bracket 28, and an opposite second end 82 with a plurality of saw teeth 83 (FIG. 3) that axially extend in a first direction (see arrow A on FIG. 1). Note that the saw teeth 83 are depicted as part of a collar 69 of the outer cylinder 66. In other examples, the collar 69 is excluded and the teeth 83 axially extend from the sidewall 67. Note that FIGS. 4-7 exclude the shroud 61 and the shroud cap 85 which are depicted in FIG. 3.

A drive rod 70 is in the hollow interior of the inner cylinder 63 and axially extends between a first end 71 and an opposite second end 72. The first end 71 has one or more radially extending pins 73. Note that in the example depicted in FIG. 2, the pins 73 are at the ends of a bolt that extends through the first end 71 of the drive rod 70. In another example, the pins 73 are welded or otherwise fastened onto the outer surface of the drive rod 70. Each pin 73 is received in one of the curved slots 65 of the inner cylinder 63 and one of the axial slots 68 of the outer cylinder 66 (see FIGS. 6-7). The number of pins 73 and curved and axial slots 65, 68 can vary. In the example depicted in FIGS. 2-7, there are two pins 73, two curved slots 65, and two axial slots 68. Note that in other examples, a unitary rod extends through the inner and outer cylinders 63, 66 and thus the ends of the rod are located in the curved and axial slots 65, 68 and are the pins 73 noted above.

The second end 72 of the drive rod 70 is received in the bore 30 in the bracket 28 and the bore 34 of the pressure plate 32. The second end 72 has an enlarged head 74 that engages a contact surface or lip of the pressure plate 32. Accordingly, as the drive rod 70 is axially moved in a first direction (see arrow A) the pressure plate 32 is also axially moved in the first direction such that the compression spring 27 is compressed between the inner end wall 18 of the first end portion 14 and the pressure plate 32 (described herein). The annular grooves 37 in the bracket 28 contain O-rings (not shown) providing a fluid-tight seal between the drive rod 70 and the bracket 28 which prevents debris and/or moisture from entering the first chamber 21.

Figure 4:
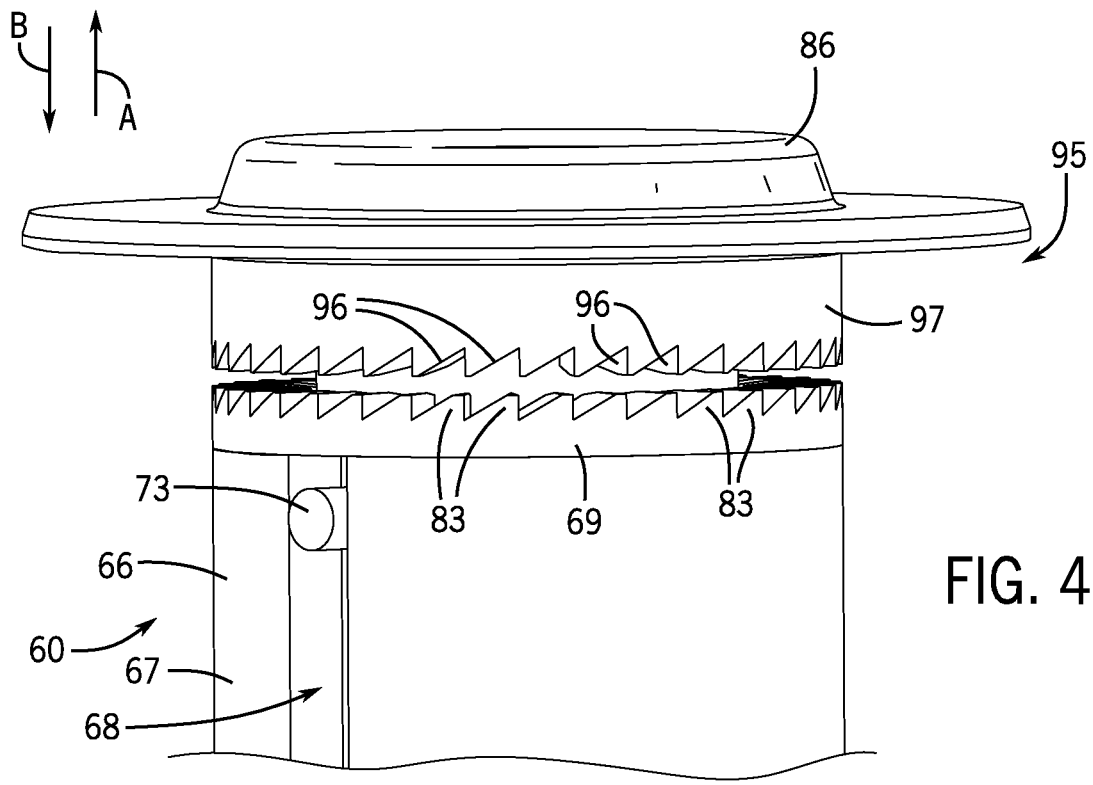
FIG. 4 is an enlarged partial view of the clutch mechanism in the disengaged position.

Referring to FIG. 3-7, the clutch actuator device 60 has a clutch mechanism 95, which is located at the second end 82 of the outer cylinder 66. The clutch mechanism 95 has a clutch cap 97 having a plurality of saw teeth 96 that extend in a second direction (see arrow B) for engagement with the saw teeth 83 on the top of the outer cylinder 66. Engagement between the teeth 83, 96 prevents rotation of the outer cylinder 66 relative to the clutch cap 97. The clutch cap 97 is normally biased upwardly out of engagement with the top of the outer cylinder 66 via a biasing element, such as a clutch spring 98 (FIG. 3), such that the clutch mechanism 95 is normally in a disengaged position (FIG. 4). The clutch mechanism 95 further includes a clutch diaphragm 86 coupled to the clutch cap 97 and the shroud cap 85. The clutch diaphragm 86 is flexible so as to move the saw teeth 96 of the clutch cap 97 into engagement the saw teeth 83 of the outer cylinder 66, thus preventing rotation of the outer cylinder 66 relative to the clutch cap 97. The clutch mechanism 95 is in an engaged position (FIG. 5) when the saw teeth 96, 83 are engaged with each other. The clutch diaphragm 86 is fixed between the shroud cap 85 and the upper perimeter of the shroud 61. A clutch chamber 87 is defined between the shroud cap 85 and the clutch diaphragm 86. A port 88 located on the shroud cap 85 is configured to admit and release compressed air to and from the clutch chamber 87.

Figure 5:
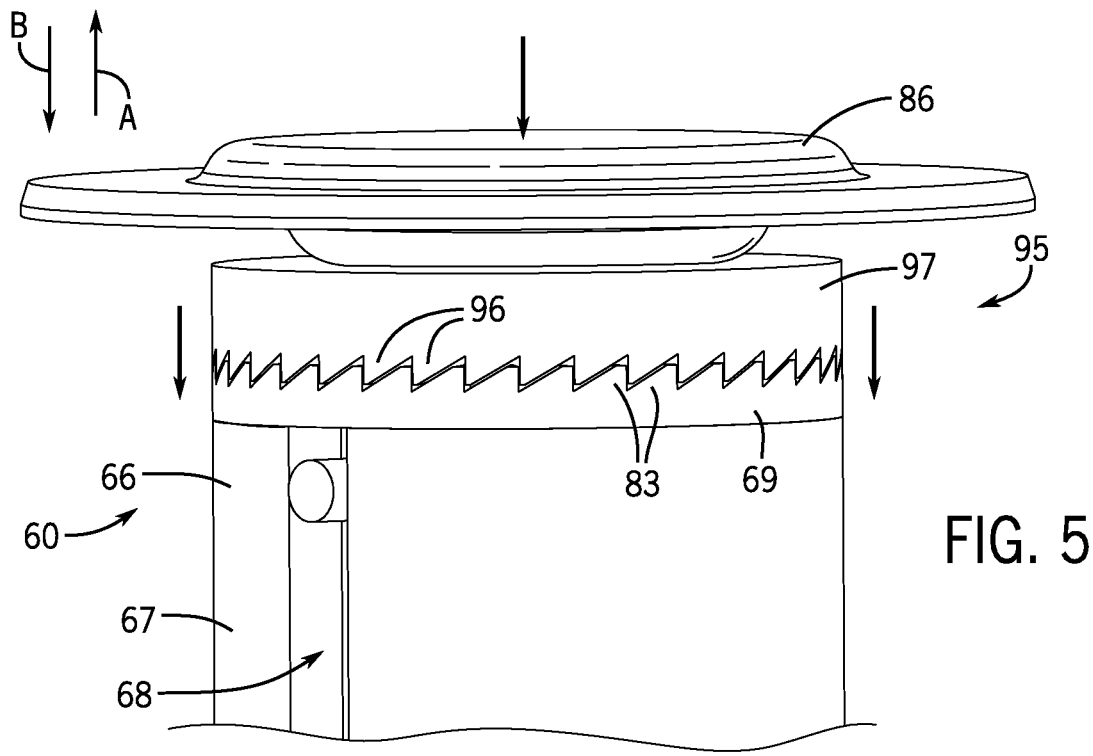
FIG. 5 is an enlarged partial view of the clutch mechanism of FIG. 4 in the engaged position.

Referring to FIG. 1, an electric motor 90 (see FIG. 1) is operably connected to the outer cylinder 66 via the slot 56 and is for rotating the outer cylinder 66 relative to the inner cylinder 63 when the clutch mechanism 95 is in the engaged position (FIG. 5). The motor 90 (FIG. 1) is preferably a bidirectional motor capable of rotating the outer cylinder 66 in either a first rotational direction or an opposite second rotational direction (see arrows R1 and R2 on FIG. 2). As will be described herein below, as the motor 90 rotates the outer cylinder 66, the drive rod 70 is axially moved to thereby move the pressure plate 32 and compress the compression spring 27 and alternately decompress the compression spring 27. The motor 90 can be any suitable motor, such as a worm gear and a helical drive, and/or comprise mating gears, such as gear 99 (FIG. 2), coupled to the outer cylinder 66. Note that the drive rod 70 moves into and out of the first chamber 21 depending on the rotational direction of the outer cylinder 66 (e.g., rotation of the outer cylinder 66 relative to the inner cylinder 63 in a first rotation direction moves the drive rod 70 out of the first chamber 21 and rotation of the outer cylinder 66 relative to the inner cylinder 63 in an opposite, second rotation direction moves the drive rod 70 further into the first chamber 21).

Figure 8:
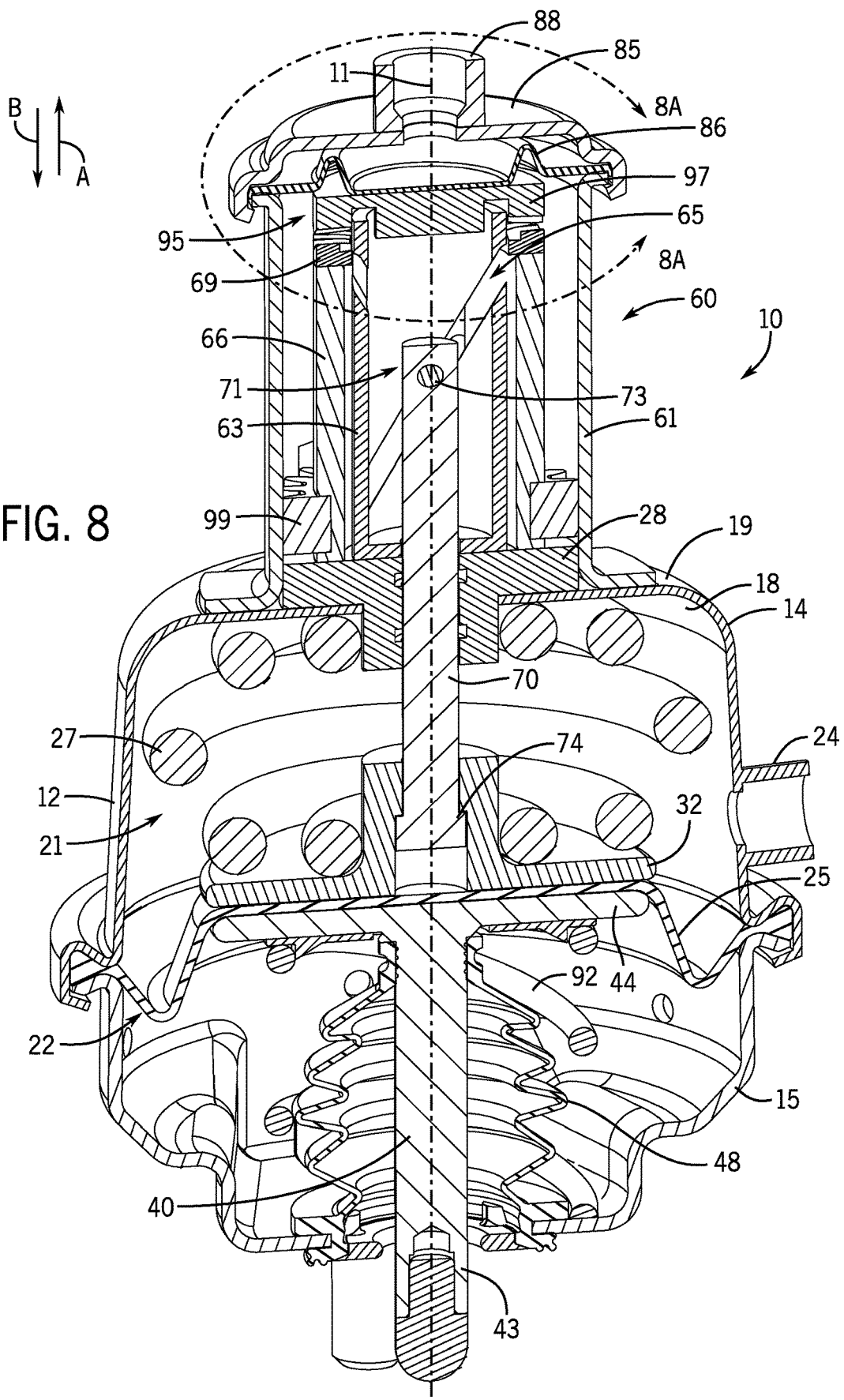
FIG. 8 is a view like FIG. 2 with the spring brake actuator in a parking state.
Figure 8A:
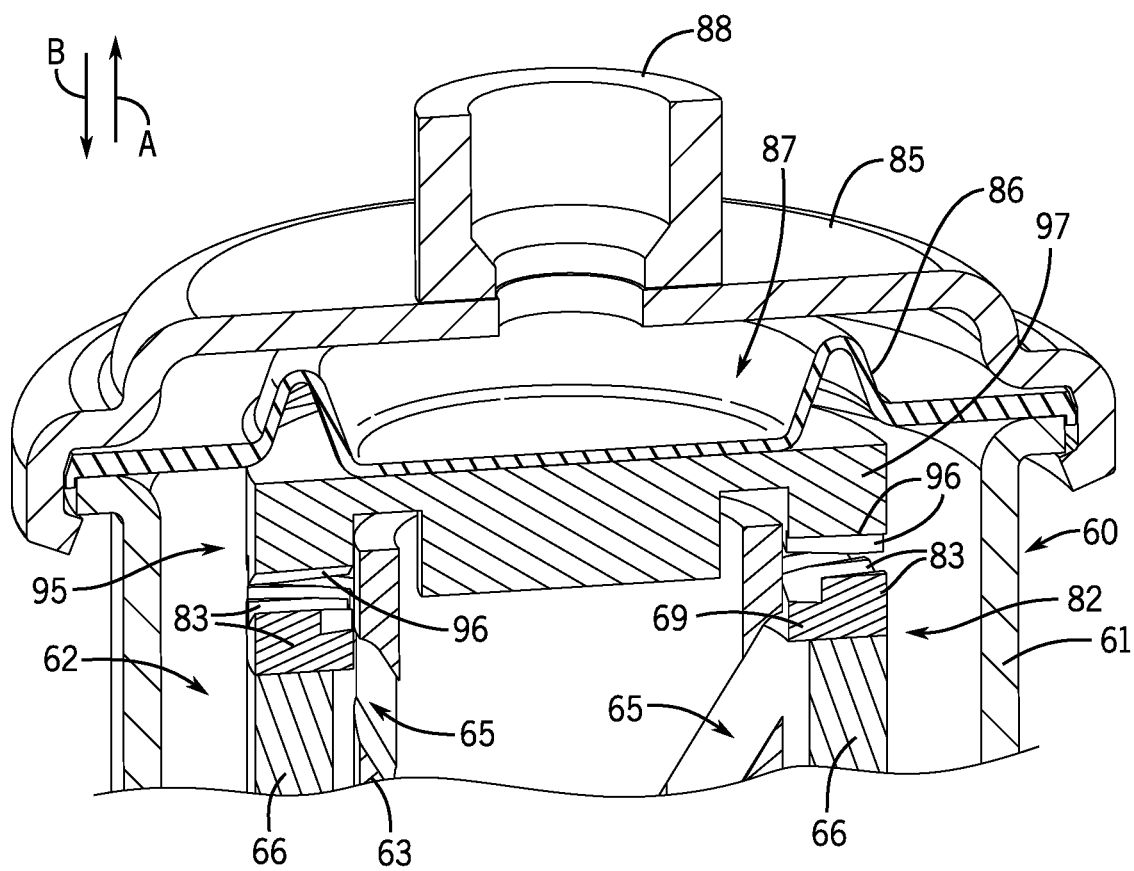
FIG. 8A is an enlarged view of the clutch actuator device within line 8A-8A on FIG. 8.
Figure 9:
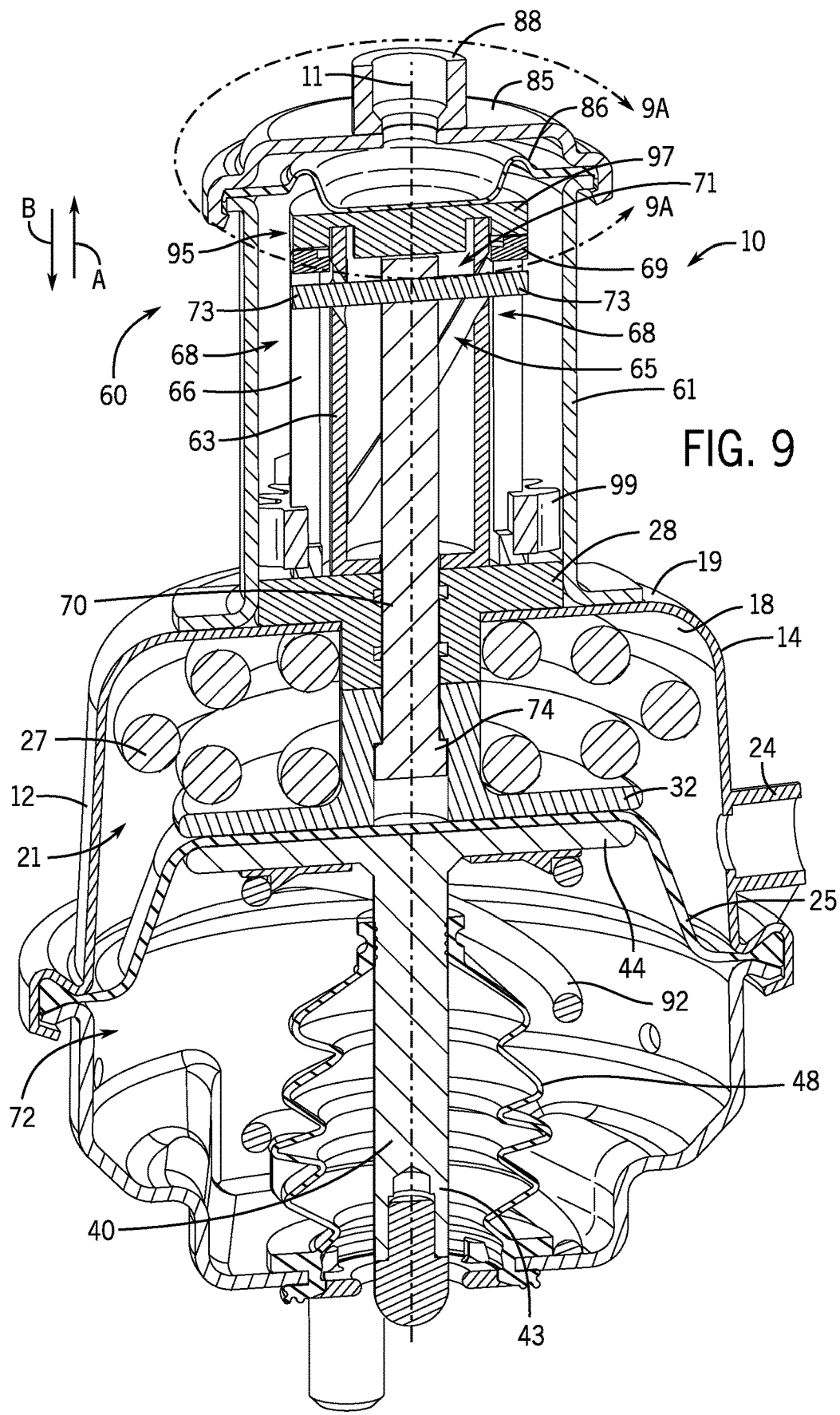
FIG. 9 is a view like FIG. 2 with the spring brake actuator in a driving state.
Figure 10:
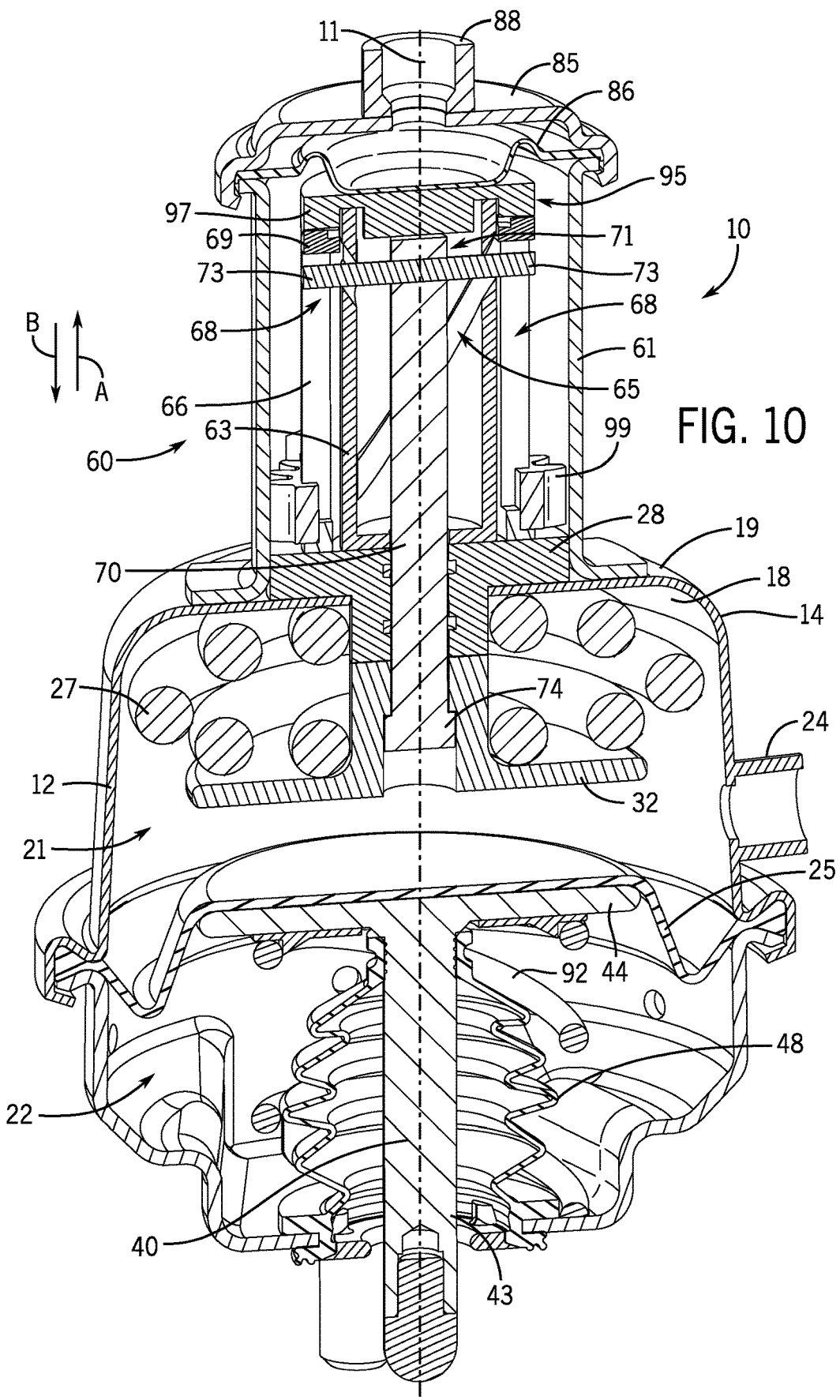
FIG. 10 is a view like FIG. 2 with the spring brake actuator in a braking state.

FIG. 8-10 depict the spring brake actuator 10 during various operational states. FIG. 8 depicts the spring brake actuator 10 in a parking state when the vehicle is off and/or a parking or emergency brake is activated. In the parking state, the compression spring 27 pushes against the pressure plate 32 in the second direction (arrow B) thereby pushing the diaphragm 25 and the push rod assembly 40 in the second direction (arrow B) such that the wheel brakes are applied. In the parking state, the motor 90 is off and the clutch mechanism 95 is in the disengaged position (see FIGS. 4 and 8A). When moving into the parking state, the drive rod 70 is pulled in the second direction (arrow B) by the pressure plate 32 as the compression spring 27 decompresses and extends in the second direction (arrow B).

Figure 9A:
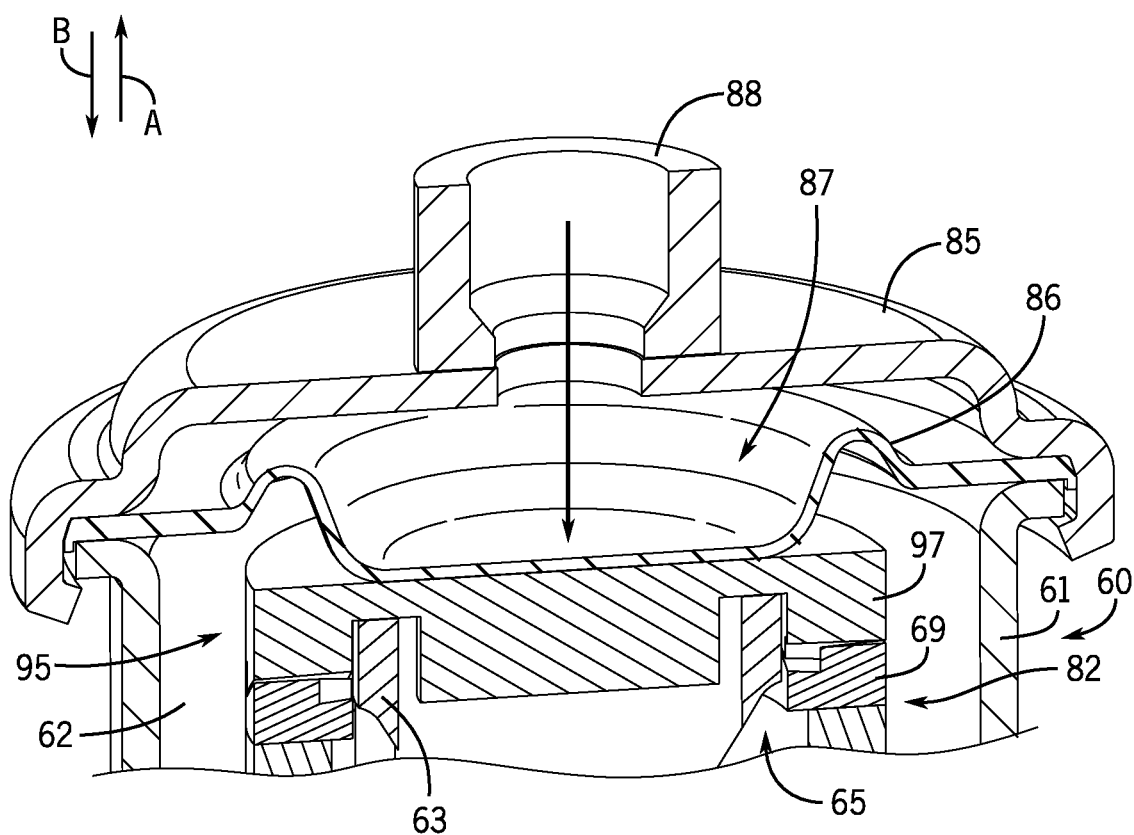
FIG. 9A is an enlarged view of the clutch actuator device within line 9A-9A on FIG. 9.

The operator can change the operational state of the spring brake actuator 10 from the parking state (noted above) to a driving state (FIG. 9), in which the vehicle may be driven, by releasing the parking brake (e.g., manually release a lever). Releasing the parking brake causes pressurized air to flow from the noted source of pressurized air on the vehicle to the spring brake actuator 10, into the clutch chamber 87 via the port 88 such that the clutch chamber 87 is pressurized, causing the clutch diaphragm 86 to flex in the second direction (arrow B). This moves the clutch mechanism 95 into the engaged position (FIGS. 5 and 9A). Subsequent activation of the motor 90 rotates the outer cylinder 66 such that the sidewall 67 of the outer cylinder 66 engages and applies camming force on the pins 73. Accordingly, the pins 73 are caused to slide along the curved slots 65 of the inner cylinder 63 and move generally axially in the first direction (arrow A). The pins 73 slide along the surfaces 79 (FIG. 7) of the inner cylinder 63. The pins 73 also axially slide in the axial slots 68 of the outer cylinder 66, and the drive rod 70 rotates as it is axially moved in the first direction (arrow A). In certain examples, a thrust bearing (not shown) is utilized between the pressure plate 32 and the drive rod 70. As the drive rod 70 is axially moved in the first direction (arrow A), the compression spring 27 is compressed between the inner end wall 18 of the first end portion 14 and the pressure plate 32 (e.g., the drive rod 70 and the pressure plate 32 move towards the inner end wall 18 in the direction of arrow A). The return spring 92 moves the diaphragm 25 and the end flange 44 of the push rod assembly 40 in the first direction (arrow A) such that the push rod 43 of the push rod assembly 40 retracts into the second chamber 22. Thus, no braking forces are applied to the wheels of the vehicle (e.g., the wheel brakes are not applied). Note that the return spring 92 biases the diaphragm 25 and the push rod assembly 40 into the positions depicted in FIG. 9. Note that the pressure in the clutch chamber 87 causes the clutch diaphragm 86 to exert an axial force on the clutch cap 97 such that the teeth 96 engage with the teeth 83 on top of the outer cylinder 66. So long as the pressure in the clutch chamber 87 remains, the teeth 96 of the clutch cap 97 engage the teeth 83 on top of the outer cylinder 66 and prevent rotation of the outer cylinder 66 when the motor 90 is deactivated. As such, the outer cylinder 66 does not rotate due to the potential energy or force in the compressed compression spring 27 that acts on the outer cylinder 66 via the drive rod 70 and the pins 73. This potential energy or force would axially pull the drive rod 70 in the second direction (arrow B). Thus, the clutch mechanism 95 and the clutch cap 97 prevent rotation of the outer cylinder 66 when the motor 90 is deactivated and thereby hold the drive rod 70 in place and prevent the compression spring 27 from decompressing. In certain examples, the clutch cap 97 is coupled (e.g., mechanical fasteners such as nuts and bolts, adhesives such as glue) to the clutch diaphragm 86.

Referring now to FIG. 10, the spring brake actuator 10 is depicted in a braking state in which the operator is depressing a brake pedal 301 (FIG. 1) to thereby apply the wheel brake to slow or stop the vehicle. When depressing the brake pedal 301, pressurized air is provided via the port 24 to the first chamber 21 such that the diaphragm 25 is moved in the second direction (arrow B). The push rod 43 moves in the second direction (arrow B) further out of the second chamber 22, causing the wheel brakes to be applied. When the operator releases the brake pedal 301, the pressurized air in the second chamber 22 is released or exhausted and the spring brake actuator 10 returns to the driving state (FIG. 9) due to the forces exerted by the return spring 92 on the diaphragm 25 and the push rod assembly 40.

Note that during the driving state (FIG. 9) and the braking state (FIG. 10), the clutch mechanism 95 remains in the engaged position (FIGS. 5 and 9A) and the compression spring 27 remains compressed because the pressurized clutch chamber 87 causes the clutch diaphragm 86 to act on the clutch mechanism 95, as noted above. In the event that the parking brake is engaged by the operator and/or pressurized air in the clutch chamber 87 is lost (e.g., due to failure of the air system of the vehicle), the pressurized air in the clutch chamber 87 is released or exhausted and the clutch mechanism 95 moves into the disengaged position (FIGS. 4 and 8A) due to the clutch spring 98. As the clutch mechanism 95 moves from the engaged position (FIGS. 5 and 9A) to the disengaged position (FIGS. 4 and 8A), the outer cylinder 66 begins to rotate and the teeth 83, 96 slide past each due to the compression spring 27 decompressing and extending in the second direction (arrow B). That is, as the compression spring 27 extends in the second direction (arrow B), the second end of the compression spring 27 applies force on the pressure plate 32 which causes the pressure plate 32 to move in the second direction (arrow B). Accordingly, the pressure plate 32 acts on and moves the diaphragm 25 and the push rod assembly 40 in the second direction (arrow B) such that the wheel brakes are applied. The movement of the pressure plate 32 in the second direction (arrow B) also causes the drive rod 70 to be pulled in the second direction (arrow B) and the pins 73 to slide along the curved and axial slots 65, 68. Generally, the drive rod 70 and the pins 73 are axially moved in the second direction (arrow B), and the curved slots 65 of the inner cylinder 63 (and the surface 79 along which the pins 73 slide) cause the pins 73 to act on the sidewall 67 of the outer cylinder 66 such that the outer cylinder 66 rotates.

Referring to FIG. 1, a controller 200 is schematically depicted. The controller 200 includes a memory 202 and a processor 204. The controller 200 is operably coupled to the motor 90, the brake pedal 301, an user input device 206, the vehicle air pressure system (not shown), and/or other vehicle systems (not shown). The motor 90 may be controlled by the controller 200 based on inputs received via the brake pedal 301, the user input device 206, and/or operational programs stored on the memory 202. The user input device 206 can include an indicator (not shown) for indicating the operational state of the spring brake actuator 10 and/or other information to the operator.

The motor 90 can have a defined start and stop position that correlates to the position of the drive rod 70 when the spring brake actuator 10 is in the driving state (FIG. 9) or the braking state (FIG. 10) and the parking state (FIG. 8). The position of the motor 90 can be controlled by the controller 200 and/or with inputs from limit switches, encoders, and other suitable devices. Furthermore, the controller 200 can be configured to determine the position of the motor 90 and/or the drive rod 70 at or between two position extents to thereby determine operational details of the spring brake actuator 10. For example, if the controller 200 determines that the motor 90 moved the drive rod 70 into a position past the position that corresponds to the parking state (FIG. 8), the controller 200 can further determine the compression spring 27 has failed or is broken and thereby alert the operator via the user input device 206.

Note that in other examples, the outer cylinder 66 is fixed relative to the flange 31 and the inner cylinder 63 is rotatable (see FIG. 2). In these examples, the motor 90 rotates the inner cylinder 63, or the inner cylinder 63 is an integral part of the motor 90, such that the pins 73 are caused to slide along the slots 65 of the inner cylinder 63 and generally axially move in the first direction (arrow A). The pins 73 also slide in the axial slots 68 of the outer cylinder 66, and the drive rod 70 rotates as it is axially moved in the first direction (arrow A).

In certain examples, a spring brake actuator 10 for applying a brake of a vehicle includes a housing 12 containing a diaphragm 25 that separates the housing 12 into first and second chambers 21, 22. A push rod assembly 40 having a push rod 43 extends out of the second chamber 22. The diaphragm 25 is flexible in a first direction to retract the push rod 43 inwardly relative to the second chamber 22 and in an opposite second direction to extend the push rod 43 outwardly from the second chamber 22. A compression spring 27 is in the first chamber 21, and a return spring 92 in the second chamber 22. A port 24 is for conveying pressurized air to the first chamber 21. A clutch actuator device 60 is for selectively compressing the compression spring 27. The spring brake actuator 10 is operable in a plurality of states including a parking state in which the clutch actuator device 60 permits extension of the compression spring 27, which flexes the diaphragm 25 in the second direction, compresses the return spring 92, and extends the push rod 43 further outwardly from the second chamber 22 for applying the brake of the vehicle. A driving state in which the clutch actuator device 60 compresses the compression spring 27, which permits the return spring 92 to extend, which flexes the diaphragm 25 in the first direction and retracts the push rod 43 further inwardly relative to the second chamber 22 for disengaging the brake of the vehicle. A braking state in which the clutch actuator device 60 compresses the compression spring 27, and further in which pressurized air is conveyed to the first chamber 21 via the port 24, which flexes the diaphragm 25 in the second direction, which compresses the return spring 92 and extends the push rod 43 further outwardly from the second chamber 22 for applying the brake of the vehicle.

In certain examples, the clutch actuator device 60 comprises a drive rod 70 extending into the first chamber 21, wherein movement of the drive rod 70 further into the first chamber 21 permits extension of the compression spring 27 and wherein movement of the drive rod 70 out of the first chamber 21 compresses the compression spring 27.

In certain examples, the clutch actuator device 60 includes inner and outer cylinders 63, 66 that are concentrically aligned on the drive rod 70, and wherein relative rotation between the inner and outer cylinders 63, 66 moves the drive rod 70 out of the first chamber 21 and wherein opposite relative rotation between the inner and outer cylinders 63, 66 moves the drive rod 70 into the first chamber 21.

In certain examples, the clutch actuator device 60 further comprises a motor 90 for causing said relative rotation. In certain examples, the outer cylinder 66 is rotatable relative to the inner cylinder 63, and wherein rotation of the outer cylinder 66 relative to the inner cylinder 63 in a first rotation direction moves the drive rod 70 out of first chamber 21 and wherein rotation of the outer cylinder 66 relative to the inner cylinder 63 in an opposite, second rotation direction moves the drive rod 70 into the first chamber 21.

In certain examples, the clutch actuator device 60 further comprises a motor 90 for causing rotation of the outer cylinder 66 relative to the inner cylinder 63.

In certain examples, a pin 73 is on the drive rod 70. The pin 73 being engaged in curved slots 65 on the inner cylinder 63 and in axial slots 68 on the outer cylinder 66, and wherein rotation of the outer cylinder 66 relative to the inner cylinder 63 causes the outer cylinder 66 to apply camming forces on the pin 73, which causes the pin 73 to translate along the curved slot 65.

In certain examples, translation of the pin 73 along the curved slot 65 moves the drive rod 70 into and alternately out of the first chamber 21.

In certain examples, the clutch actuator device 60 includes a clutch mechanism 95 that is movable into a disengaged position preventing extension and retraction of the push rod 43 and into an engaged position permitting extension and retraction of the push rod 43.

In certain examples, the clutch mechanism 95 is pneumatically actuated into the engaged position.

In certain examples, the clutch mechanism 95 comprises a clutch cap 97 on the outer cylinder 66, a clutch spring 98 that normally biases the clutch cap 97 away from the outer cylinder 66, and a clutch diaphragm 86 coupled to the clutch cap 97. The clutch diaphragm 86 is flexible towards the outer cylinder 66 to engage the clutch cap 97 with the outer cylinder 66 in the engaged position and wherein the clutch diaphragm 86 is flexible away from the outer cylinder 66 to disengage the clutch cap 97 from the outer cylinder 66 in the disengaged position.

In certain examples, the clutch actuator device 60 includes a shroud cap 85 and a port 88 through the shroud cap 85 for supplying pressurized air to a clutch chamber 87 defined between the shroud cap 85 and the clutch diaphragm 86, and wherein supplying pressurized air to the clutch chamber 87 flexes the clutch diaphragm 86 towards the outer cylinder 66, and wherein removing pressurized air from the clutch chamber 87 permits the clutch spring 98 to bias the clutch cap 97 away from the outer cylinder 66.

In certain examples, a source of pressurized air supplies pressurized air to both the clutch chamber 87 and to the first chamber 21.

In certain examples, the clutch actuator device 60 comprises a clutch mechanism 95 that is positionable in a disengaged position preventing extension and retraction of the push rod 43 and an engaged position permitting extension and retraction of the push rod 43.

In certain examples, a clutch actuator device 60 is for selectively retaining a compression spring 27 of a spring brake actuator 10 in a compressed position. The clutch actuator device 60 includes a drive rod 70 for extending into the spring brake actuator 10 and operably engaging the compression spring 27. Inner and outer cylinders 63, 66 are concentrically aligned on the drive rod 70, wherein relative rotation between the inner and outer cylinders 63, 66 causes the drive rod 70 to move further out of the inner cylinder 63 for decompressing the compression spring 27 and alternately to move further into the inner cylinder 63 for compressing the compression spring 27. A motor 90 causes the relative rotation, and a pneumatically actuated clutch mechanism 95 is movable into an engaged position preventing said relative rotation and a disengaged position permitting said relative rotation.

In certain examples, the outer cylinder 66 is rotatable relative to the inner cylinder 63, and wherein rotation of the outer cylinder 66 relative to the inner cylinder 63 in a first rotation direction moves the drive rod 70 out of the first chamber 21 and wherein rotation of the outer cylinder 66 relative to the inner cylinder 63 in an opposite, second rotation direction moves the drive rod 70 into the first chamber 21.

In certain examples, a pin 73 is on the drive rod 70, and the pin 73 is engaged in curved slots 65 on the inner cylinder 63 and in axial slots 68 on the outer cylinder 66, wherein rotation of the outer cylinder 66 relative to the inner cylinder 63 causes the outer cylinder 66 to apply camming forces on the pin 73, which causes the pin 73 to translate along the curved slot 65, and wherein translation of the pin 73 along the curved slots 65 moves the drive rod 70 into and alternately out of the first chamber 21.

In certain examples, the clutch mechanism 95 includes a clutch cap 97 on the outer cylinder 66, a clutch spring 98 that normally biases the clutch cap 97 away from the outer cylinder 66, and a clutch diaphragm 86 coupled to the clutch cap 97. The clutch diaphragm 86 is flexible towards the outer cylinder 66 to engage the clutch cap 97 with the outer cylinder 66 and the clutch diaphragm 86 is flexible away from the outer cylinder 66 to disengage the clutch cap 97 from the outer cylinder 66.

In certain examples, the clutch actuator device 60 includes a shroud cap 85 and a port 88 through the shroud cap 85 for supplying pressurized air to a clutch chamber 87 defined between the shroud cap 85 and the clutch diaphragm 86. Supplying the pressurized air to the clutch chamber 87 flexes the clutch diaphragm 86 towards the outer cylinder 66, and wherein removing pressurized air from the clutch chamber 87 permits the clutch spring 98 to bias the clutch cap 97 away from the outer cylinder 66.

In certain examples, the clutch mechanism 95 comprises a clutch cap 97 on the outer cylinder 66, a clutch spring 98 that normally biases the clutch cap 97 away from the outer cylinder 66, and a clutch diaphragm 86 coupled to the clutch cap 97. The clutch diaphragm 86 is flexible towards the outer cylinder 66 to engage the clutch cap 97 with the outer cylinder 66 and the clutch diaphragm 86 is flexible away from the outer cylinder 66 to disengage the clutch cap 97 from the outer cylinder 66.

The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A spring brake actuator for applying a brake of a vehicle, the spring brake actuator comprising:
   a housing containing a diaphragm that separates the housing into first and second chambers;
   a push rod assembly having a push rod extending out of the second chamber;
   wherein the diaphragm is flexible in a first direction to retract the push rod inwardly relative to the second chamber and in an opposite second direction to extend the push rod outwardly from the second chamber;
   a compression spring in the first chamber;
   a return spring in the second chamber;
   a port for conveying pressurized air to the first chamber; and
   a clutch actuator device for selectively compressing the compression spring,
   wherein the spring brake actuator is operable in a plurality of states comprising:
      a parking state in which the clutch actuator device permits extension of the compression spring, which flexes the diaphragm in the second direction, compresses the return spring, and extends the push rod further outwardly from the second chamber for applying the brake of the vehicle;
      a driving state in which the clutch actuator device compresses the compression spring, which permits the return spring to extend, which flexes the diaphragm in the first direction and retracts the push rod further inwardly relative to the second chamber for disengaging the brake of the vehicle; and
      a braking state in which the clutch actuator device compresses the compression spring, and further in which pressurized air is conveyed to the first chamber via the port, which flexes the diaphragm in the second direction, which compresses the return spring and extends the push rod further outwardly from the second chamber for applying the brake of the vehicle.

2. The spring brake actuator according to claim 1, wherein the clutch actuator device comprises a drive rod extending into the first chamber, wherein movement of the drive rod further into the first chamber permits extension of the compression spring and wherein movement of the drive rod out of the first chamber compresses the compression spring.

3. The spring brake actuator according to claim 2, wherein the clutch actuator device further comprises inner and outer cylinders that are concentrically aligned on the drive rod, and wherein relative rotation between the inner and outer cylinders moves the drive rod out of the first chamber and wherein opposite relative rotation between the inner and outer cylinders moves the drive rod into the first chamber.

4. The spring brake actuator according to claim 3, wherein the clutch actuator device further comprises a motor for causing said relative rotation.

5. The spring brake actuator according to claim 3, wherein the outer cylinder is rotatable relative to the inner cylinder, and wherein rotation of the outer cylinder relative to the inner cylinder in a first rotation direction moves the drive rod out of the first chamber and wherein rotation of the outer cylinder relative to the inner cylinder in an opposite, second rotation direction moves the drive rod into the first chamber.

6. The spring brake actuator according to claim 5, wherein the clutch actuator device further comprises a motor for causing rotation of the outer cylinder relative to the inner cylinder.

7. The spring brake actuator according to claim 5, further comprising a pin on the drive rod, the pin being engaged in a curved slot on the inner cylinder and in an axial slot on the outer cylinder, and wherein rotation of the outer cylinder relative to the inner cylinder causes the outer cylinder to apply forces on the pin, which causes the pin to translate along the curved slot.

8. The spring brake actuator according to claim 7, wherein translation of the pin along the curved slot moves the drive rod into and alternately out of the first chamber.

9. The spring brake actuator according to claim 5, wherein the clutch actuator device comprises a clutch mechanism that is movable into a disengaged position preventing extension and retraction of the push rod and into an engaged position permitting extension and retraction of the push rod.

10. The spring brake actuator according to claim 9, wherein the clutch mechanism is pneumatically actuated into the engaged position.

11. The spring brake actuator according to claim 10, wherein the clutch mechanism comprises a clutch cap on the outer cylinder, a clutch spring that normally biases the clutch cap away from the outer cylinder, and a clutch diaphragm coupled to the clutch cap, and wherein the clutch diaphragm is flexible towards the outer cylinder to engage the clutch cap with the outer cylinder in the engaged position and wherein the clutch diaphragm is flexible away from the outer cylinder to disengage the clutch cap from the outer cylinder in the disengaged position.

12. The spring brake actuator according to claim 11, further comprising a shroud cap and a port through the shroud cap for supplying pressurized air to a clutch chamber defined between the shroud cap and the clutch diaphragm, wherein supplying pressurized air to the clutch chamber flexes the clutch diaphragm towards the outer cylinder, and wherein removing pressurized air from the clutch chamber permits the clutch spring to bias the clutch cap away from the outer cylinder.

13. The spring brake actuator according to claim 12, further comprising a source of pressurized air that supplies pressurized air to both the clutch chamber and to the first chamber.

14. The spring brake actuator according to claim 2, wherein the clutch actuator device comprises a clutch mechanism that is positionable in a disengaged position preventing extension and retraction of the push rod and an engaged position permitting extension and retraction of the drive rod.

15. A clutch actuator device for selectively retaining a compression spring of a spring brake actuator in a compressed position, the clutch actuator device comprising:
   a drive rod for extending into the spring brake actuator and operably engaging the compression spring;
   inner and outer cylinders that are concentrically aligned on the drive rod, wherein relative rotation between the inner and outer cylinders causes the drive rod to move further out of the inner cylinder for decompressing the compression spring and alternately to move further into the inner cylinder for compressing the compression spring;
   a motor for causing said relative rotation; and
   a pneumatically actuated clutch mechanism that is movable into an engaged position preventing said relative rotation and a disengaged position permitting said relative rotation.

16. The clutch actuator device according to claim 15, wherein the outer cylinder is rotatable relative to the inner cylinder, and wherein rotation of the outer cylinder relative to the inner cylinder in a first rotation direction moves the drive rod out of a first chamber and wherein rotation of the outer cylinder relative to the inner cylinder in an opposite, second rotation direction moves the drive rod into the first chamber.

17. The clutch actuator device according to claim 16, further comprising a pin on the drive rod, the pin being engaged in a curved slot on the inner cylinder and in an axial slot on the outer cylinder, wherein rotation of the outer cylinder relative to the inner cylinder causes the outer cylinder to apply forces on the pin, which causes the pin to translate along the curved slot, and wherein translation of the pin along the curved slot moves the drive rod into and alternately out of the first chamber.

18. The clutch actuator device according to claim 17, wherein the clutch mechanism comprises a clutch cap on the outer cylinder, a clutch spring that normally biases the clutch cap away from the outer cylinder, and a clutch diaphragm coupled to the clutch cap, and wherein the clutch diaphragm is flexible towards the outer cylinder to engage the clutch cap with the outer cylinder and wherein the clutch diaphragm is flexible away from the outer cylinder to disengage the clutch cap from the outer cylinder.

19. The clutch actuator device according to claim 18, further comprising a shroud cap and a port through the shroud cap for supplying pressurized air to a clutch chamber defined between the shroud cap and the clutch diaphragm, wherein supplying the pressurized air to the clutch chamber flexes the clutch diaphragm towards the outer cylinder, and wherein removing pressurized air from the clutch chamber permits the clutch spring to bias the clutch cap away from the outer cylinder.

20. The clutch actuator device according to claim 15, wherein the clutch mechanism comprises a clutch cap on the outer cylinder, a spring that normally biases the clutch cap away from the outer cylinder, and a clutch diaphragm coupled to the clutch cap, and wherein the clutch diaphragm is flexible towards the outer cylinder to engage the clutch cap with the outer cylinder and wherein the clutch diaphragm is flexible away from the outer cylinder to disengage the clutch cap from the outer cylinder.

* * * * *